United States Patent
Thiessen et al.

(10) Patent No.: US 10,501,696 B2
(45) Date of Patent: Dec. 10, 2019

(54) ROTATING AND MOVABLE BED GASIFIER PRODUCING HIGH CARBON CHAR

(71) Applicants: Randall J. Thiessen, Toledo, IA (US); La Voy M. Thiessen, Jr., Parker, CO (US)

(72) Inventors: Randall J. Thiessen, Toledo, IA (US); La Voy M. Thiessen, Jr., Parker, CO (US)

(*) Notice: Subject to any disclaimer, the term of this patent is extended or adjusted under 35 U.S.C. 154(b) by 95 days.

(21) Appl. No.: 15/521,187

(22) PCT Filed: Oct. 23, 2014

(86) PCT No.: PCT/US2014/062024
§ 371 (c)(1),
(2) Date: Apr. 21, 2017

(87) PCT Pub. No.: WO2016/064407
PCT Pub. Date: Apr. 28, 2016

(65) Prior Publication Data
US 2017/0349847 A1    Dec. 7, 2017

(51) Int. Cl.
*C10J 3/32* (2006.01)
*C10J 3/42* (2006.01)
(Continued)

(52) U.S. Cl.
CPC . *C10J 3/32* (2013.01); *C10J 3/26* (2013.01); *C10J 3/42* (2013.01); *C10J 3/723* (2013.01);
(Continued)

(58) Field of Classification Search
CPC ....... C10J 3/32; C10J 3/26; C10J 3/723; C10J 3/42; C10J 2300/1807; C10J 2300/165;
(Continued)

(56) References Cited

U.S. PATENT DOCUMENTS 3,587,489 A    6/1971    Demar
3,818,869 A    6/1974    Blaskowski
(Continued)

FOREIGN PATENT DOCUMENTS

CA    2473743 A1    7/2003
DE    3642619 A1    6/1988
(Continued)

OTHER PUBLICATIONS

Brewer, C. E., Schmidt-Rohr, K. , Satrio, J. A. and Brown, R. C. (2009), Characterization of biochar from fast pyrolysis and gasification systems. Environ. Prog. Sustainable Energy, 28: 386-396. doi:10.1002/ep.10378 (Year: 2009).*
(Continued)

*Primary Examiner* — Anthony J Zimmer
(74) *Attorney, Agent, or Firm* — McKee, Voorhees & Sease, PLC

(57) ABSTRACT

The present invention includes a gasifier for gasifying fuels having a container with a top, sidewalls and a bottom for facilitating the gasifying process. One or more open vertical shafts extend downward inside the container for allowing a downdraft or updraft of air and fuel for the gasifying process. A rotating bed is preferably included inside the container and below the one or more shafts for receiving the fuel. The bed rotates essentially perpendicular to the shaft to facilitate even heating and gasifying of the fuel. The bed is further movable relative to the vertical shaft in order to increase or decrease the volume of fuel flow to the fuel.

21 Claims, 12 Drawing Sheets

(51) Int. Cl.
*F23G 5/26* (2006.01)
*F23G 5/027* (2006.01)
*F23G 7/10* (2006.01)
*C10J 3/72* (2006.01)
*C10J 3/26* (2006.01)

(52) U.S. Cl.
CPC .............. *F23G 5/0276* (2013.01); *F23G 5/26* (2013.01); *F23G 7/10* (2013.01); *C10J 2200/09* (2013.01); *C10J 2300/0916* (2013.01); *C10J 2300/0956* (2013.01); *C10J 2300/165* (2013.01); *C10J 2300/1653* (2013.01); *C10J 2300/1675* (2013.01); *C10J 2300/1807* (2013.01); *F23G 2206/202* (2013.01); *F23G 2206/203* (2013.01); *Y02E 20/12* (2013.01); *Y02E 20/18* (2013.01)

(58) Field of Classification Search
CPC ........ C10J 2300/1675; C10J 2300/1653; C10J 2200/09; C10J 2300/0956; C10J 2300/0916; F23G 5/0276; F23G 7/10; F23G 5/26; F23G 2206/202; F23G 2206/203; Y02E 20/18; Y02E 20/12
See application file for complete search history.

(56) References Cited

U.S. PATENT DOCUMENTS

| | | | |
|---|---|---|---|
| 3,951,616 A | 4/1976 | Rudolph | |
| 3,966,634 A | 6/1976 | Sacks | |
| 3,986,348 A | 10/1976 | Switzer, Jr. | |
| 4,011,059 A | 3/1977 | Daly et al. | |
| 4,385,905 A | 5/1983 | Tucker | |
| 4,453,950 A | 6/1984 | Fasching | |
| 4,478,039 A | 10/1984 | Horgan | |
| 4,497,637 A | 2/1985 | Purdy et al. | |
| 4,498,909 A | 2/1985 | Milner et al. | |
| 4,519,810 A | 5/1985 | Haas | |
| 4,583,992 A | 4/1986 | Rogers | |
| 4,617,182 A | 10/1986 | Brown et al. | |
| 4,659,340 A | 4/1987 | Weaver | |
| 4,764,185 A | 8/1988 | Mayer | |
| 4,918,915 A | 4/1990 | Pfefferle | |
| 5,028,241 A | 7/1991 | Kooiman et al. | |
| 5,089,030 A | 2/1992 | Michel-Kim | |
| 5,226,927 A | 7/1993 | Rundstrom | |
| 5,230,716 A | 7/1993 | Notestein | |
| 5,279,234 A | 1/1994 | Bender et al. | |
| 5,507,141 A | 4/1996 | Stigsson | |
| 5,534,659 A | 7/1996 | Springer et al. | |
| 5,563,803 A | 10/1996 | Morihara et al. | |
| 5,573,559 A | 11/1996 | Hilliard et al. | |
| 5,584,255 A | 12/1996 | Bishop et al. | |
| 5,624,470 A | 4/1997 | Tanca | |
| 5,626,088 A | 5/1997 | Hiltunen et al. | |
| 5,626,638 A | 5/1997 | Valkanas | |
| 5,666,801 A | 9/1997 | Rohrer | |
| 5,837,316 A | 11/1998 | Fuchita | |
| 5,922,090 A | 7/1999 | Fujimura et al. | |
| 5,937,652 A | 8/1999 | Abdelmalek | |
| 5,938,975 A | 8/1999 | Ennis et al. | |
| 6,149,765 A | 11/2000 | Mansour et al. | |
| 6,637,206 B2 | 10/2003 | Thiessen | |
| 6,680,137 B2 | 1/2004 | Paisley | |
| 8,505,300 B2 | 8/2013 | Thiessen | |
| 8,961,626 B1 | 2/2015 | Thiessen et al. | |
| 2002/0088236 A1 | 7/2002 | Arar et al. | |
| 2003/0196577 A1 | 10/2003 | Lefcort | |
| 2004/0020207 A1 | 2/2004 | Thiessen | |
| 2004/0182294 A1 | 9/2004 | Hahn et al. | |
| 2006/0180459 A1 | 8/2006 | Bielenberg | |
| 2007/0169411 A1 | 7/2007 | Thiessen et al. | |
| 2008/0086945 A1 | 4/2008 | Wunning | |
| 2009/0018222 A1 | 1/2009 | Klepper et al. | |
| 2009/0060803 A1 | 3/2009 | Schinski | |
| 2009/0158658 A1 | 6/2009 | Stadler et al. | |
| 2009/0217574 A1* | 9/2009 | Coleman | .................. C10L 5/00 44/501 |
| 2014/0033777 A1 | 2/2014 | Schendel et al. | |
| 2014/0228598 A1 | 8/2014 | Datta et al. | |

FOREIGN PATENT DOCUMENTS

| | | |
|---|---|---|
| EP | 0117765 A2 | 9/1984 |
| EP | 1466080 B1 | 10/2004 |
| WO | 03062608 A1 | 7/2003 |
| WO | 2009100487 A1 | 8/2009 |
| WO | 2016064407 A1 | 4/2016 |

OTHER PUBLICATIONS

Examination Report No. 1 for Standard Patent Application, Application No. 2014409609, Australian Government—IP Australia, pp. 1-5. Mar. 6, 2018.
Woodgas, Combustible Gases from Dry Biomass, http://www.woodgas.com, pp. 1-2. Jul. 6, 2017.
Reed, Thomas B. et al., "A Survey of Biomass Gasification 2001", 2nd Edition, pp. 1-221. 2001.
"Biomass Gasification Technology and Utilisation", Overview of Gasification Technology, http://cturare.tripod.com/ove.htm, pp. 1-2. Mar. 19, 2018.
"Biomass Gasification Technology and Utilisation", History and Development, http://cturare.tripod.com/his.htm, pp. 1-2. Mar. 19, 2018.
Niessen, Walter R. et al., "Evaluation of Gasification and Novel Thermal Processes for the Treatment of Municipal Solid Waste", NREL/TP-430-21612, pp. 1-207. Aug. 1996.
Tyre Pyrolysis & Gasification Category, http://www.tirestyres.com/a/rb8070.html, pp. 1-6. Mar. 19, 2018.
Biomass Gasifiers: A Viable Option, teriin.org/news/terivsn/issue30/biomass.htm, pp. 1-4. Mar. 19, 2018.

* cited by examiner

ROTATING AND MOVABLE BED GASIFIER PRODUCING HIGH CARBON CHAR

BACKGROUND OF THE INVENTION

The present invention relates generally to an apparatus for providing a more effective and efficient gasifier apparatus which produces a high carbon ratio char product. More particularly, although not exclusively, the present invention relates to a rotating and movable bed gasifier apparatus.

Currently, there are many types of gasifier systems. Typically the gasification process is the primary energy generation means. Gasification generally takes materials, such as wood, coal, charcoal, agricultural residues, energy crops, municipal solid waste or other biomass materials, and gasifies them to make a "gas" used for power or electricity generation or other uses, such as heat production. A typical gasification system consists of a gasifier unit, a filtering system, and an energy converter.

Steam boiler/combustor units are also well-known, though their use for primary energy generation has been questionable for some time, mainly because of the harmful resultant emissions. A steam boiler/combustor creates high pressure steam used for power generation. Prior art systems apply steam boiler/combustor units as secondary energy generation means to gain energy and thus increase efficiency and reduce pollutants such as gasses produced during the gasification process. An example of this type of system can be found in U.S. Pat. No. 6,637,206 to Thiessen, which is herein incorporated by reference in its entirety.

One problem with fixed bed gasifiers is that there are inherent "hot spots" in the fuel, causing uneven gasifying. Some of these systems add moving fingers to the fixed bed to agitate the fuel to aid in the gasification process. The torque force on the fingers increases as the diameter of the fire tube holding the fuel increases. This limits the size of the gasifier which can be constructed. By creating too large a gasifier, these fingers or the shaft holding them bend and break during the agitation.

U.S. Pat. No. 2,226,927 to Rundstrom is an up-draft gasifier which uses a grate system which reciprocates vertically, up and down, within a fixed bed core to maintain an even flow of fuel and gas and allow for the removal of ash. A problem with these vertically reciprocating beds and fixed bed gasifiers is that the larger the gasifier, the more chance for uneven heating inside the bed gasifier and thus poor gasifying of the fuel.

A further problem with immovable gasifiers is that as ash is built up during the gasification process, fuel flow is reduced. This reduction in fuel flow can result in decreased efficiency of the gasification process.

A further problem with immovable gasifiers is that different fuels require various amounts of fuel flow in order to maintain a proper and consistent burn temperature. Without a proper volume of fuel flow to the fuel, the efficiency of the system is reduced.

Thus, in view of the foregoing, it is desirable to have an improved gasifying system that solves these and other problems of the prior art.

Therefore, the primary feature or advantage of the present invention is an improved gasifier.

Another feature or advantage of the present invention is the provision of a gasifier which reduces the size limitations in which a gasifier fuel mixer can be built.

Another feature or advantage of the present invention is the provision of a gasifier that more uniformly heats the material being gasified to improve efficiency.

Another feature or advantage of the present invention is the provision of a gasifier that improves fuel flow to the fuel.

Another feature or advantage of the present invention is the provision of a gasifier that preferably includes a rotating bed, is economical to manufacture, durable in use and efficient in operation.

Another feature or advantage of the present invention is the provision of a gasifier that preferably includes a movable bed for controlling the volume of fuel flow to the burning fuel.

These and the other features or advantages of the present invention will be apparent from the specification and claims that follow.

BRIEF SUMMARY OF THE INVENTION

One or more of the foregoing features or advantages may be achieved by a gasifier having a container with a top, sidewalls, and a bottom for facilitating the gasifying process. An open vertical shaft extends down from the top of the container and allows a downdraft or updraft of air to mix with fuel for the gasifying process. A rotating bed inside the container preferably located below the shaft receives the fuel; the bed rotates essentially perpendicular to the shaft.

A further aspect of the present invention involves one or more fingers extending from a lower portion of the shaft for mixing the fuel with the air. The present invention may also include one or more fingers which extend upward from the rotating bed for mixing the fuel with the air. The present invention also preferably includes a shaft attached to the bed for rotating the bed.

Another aspect of the present invention is an ash auger for removing used fuel from the container. Yet another aspect of the present invention is the provision of a gasifier which recycles the used fuel back into the shaft for reusing the fuel. Another provision of the present invention is a gasifier having a bed with sidewalls extending upward to hold the fuel onto the bed.

Another aspect of the present invention is a gasifier having a bed which may be raised or lowered relative to the shaft so as to ensure consistent and proper fuel flow to the burning fuel or char as ash is produced.

One or more of the foregoing features or advantages may be achieved by the gasifier having a container with a top, sidewalls, and a bottom for facilitating the gasifying process, a first open vertical shaft extending inside the container, a second open vertical shaft inside the first vertical shaft creating a space between the first and second shafts for allowing a downdraft of air and fuel for the gasifying process in the space between the first and second shafts, and a rotating bed inside the container, below the space between the first and second shafts for receiving the fuel, the bed rotating essentially perpendicular to the shafts and moving essentially parallel to the shafts to control fuel flow into or from the fuel.

DETAILED DESCRIPTION OF THE PREFERRED EMBODIMENT

A. Introduction

Figure 1:
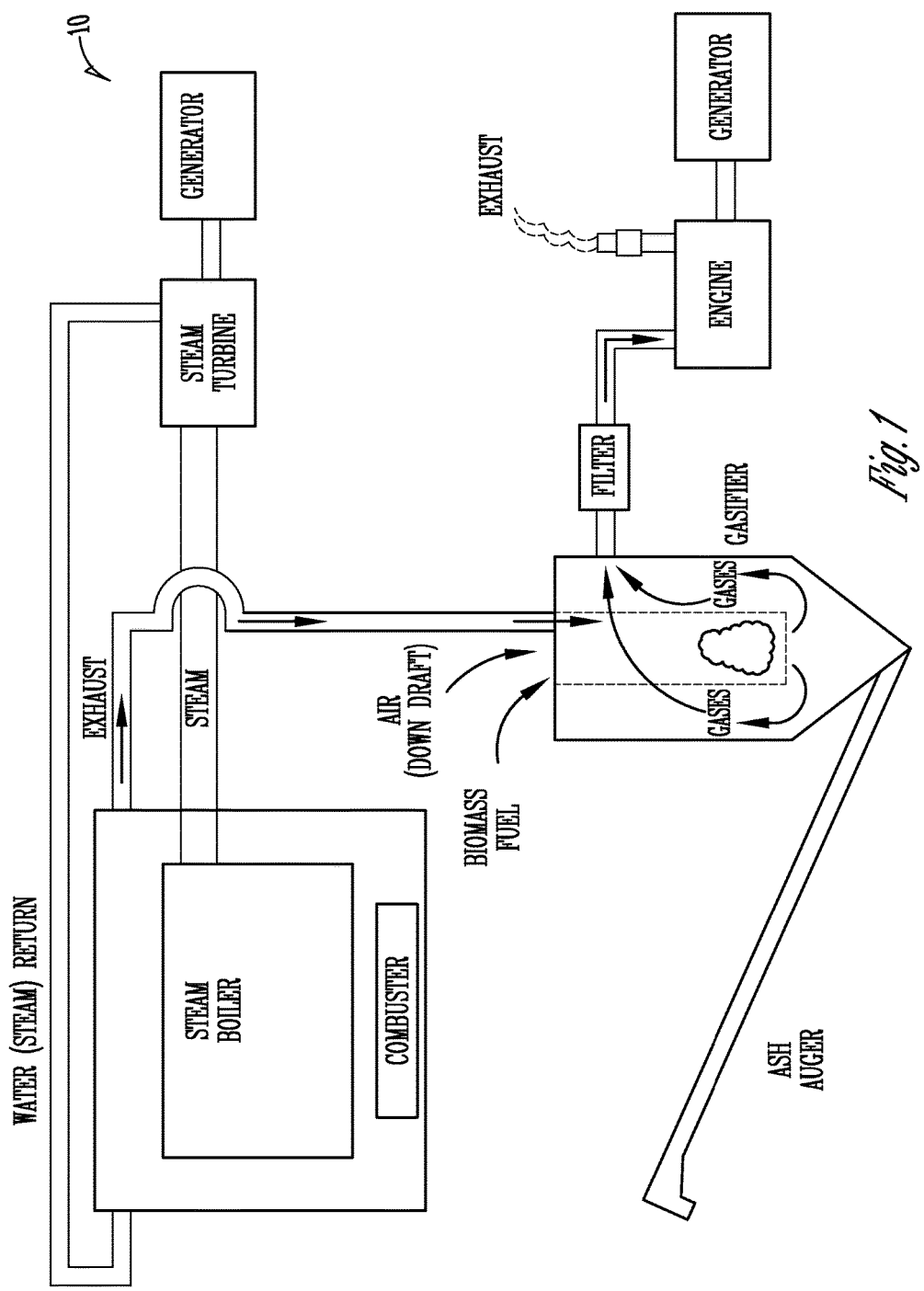
FIG. 1 shows one embodiment of a gasifier system assembly for using a gasifier to create energy.

The present invention relates to a rotating and movable bed gasifier. The present invention can be used in a system such as the system 10 as shown in FIG. 1. However, the present invention can be used in any type of system where a gasifier for gasifying solid fuels is desired.

The present disclosure contemplates the use of a gasifier as a device for filtering dirty gas into one that is clean burning. Several variations of burning fuel and filtering are contemplated.

In a first example, a first combustion chamber is used to burn dirty (or synthetic) fuel to produce dirty exhaust. The dirty exhaust is then injected into the gasifier in combination with a fuel comprising biomass, such as treated seed corn or other well known biomass. The char resulting from the burning of the seed corn results in a filter which is utilized to purify the exhaust, thereby creating a clean burning usable gas. The clean burning usable gas is then transferred to a steam boiler or like apparatus for converting heat energy into work or electricity.

In a second example, biofuel, such as treated seed corn or other well known biomass are combined with a dirty fuel prior to combustion. The ratio of dirty fuel to biofuel is preferably 20% to 80% (1:4), however other variations may also be used. The ratio of dirty fuel to biofuel may depend on the particular dirty fuel used and the particular biofuel, as various dirty fuels produce a variable amount of pollutants and various biofuels have various filtering capabilities.

B. Rotating Bed Gasifier

Figure 2:
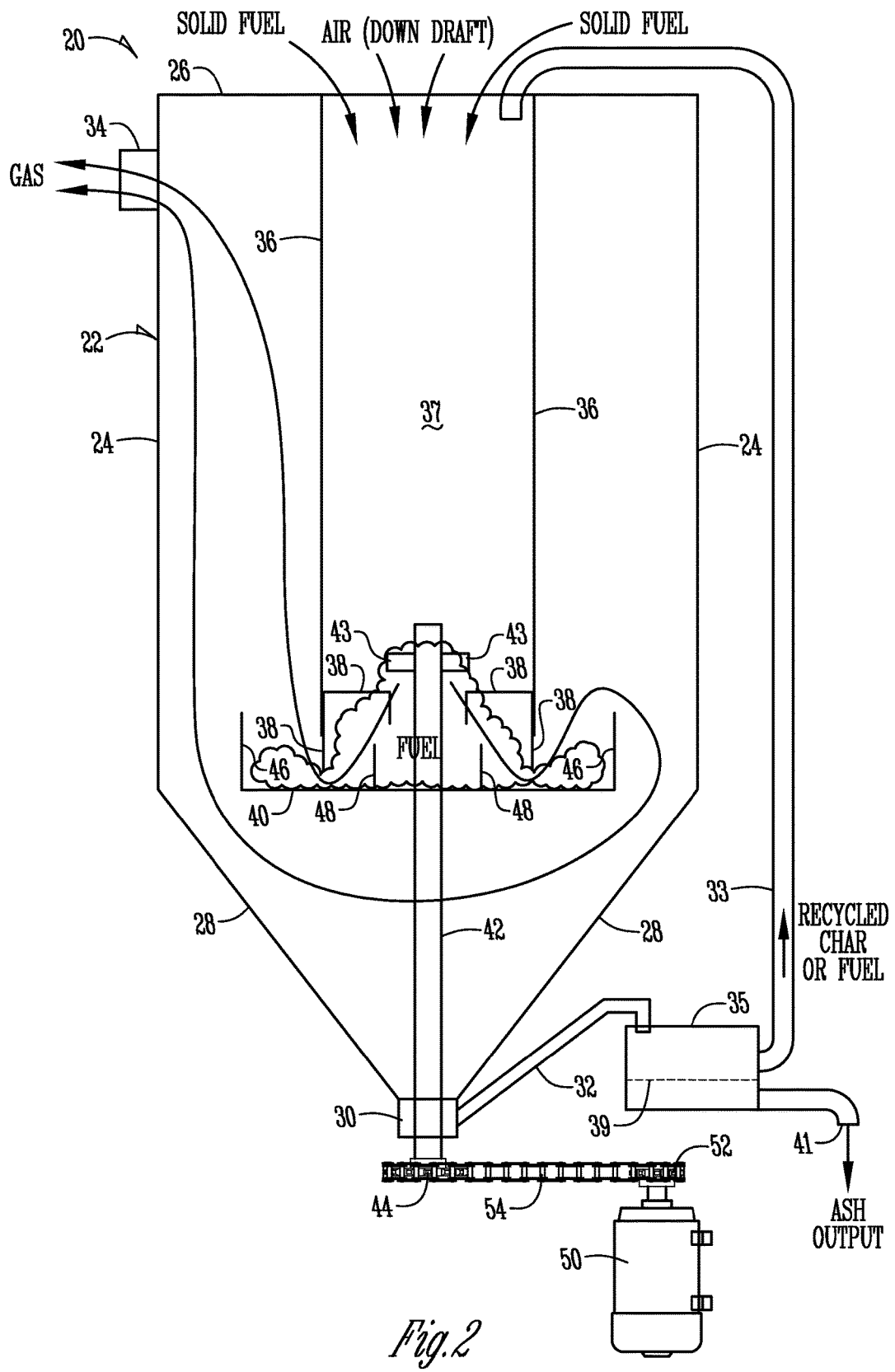
FIG. 2 shows a cut away view of one embodiment of a downdraft rotating bed gasifier.

Referring now to FIG. 2, a cut away side view of one embodiment of a rotating bed gasifier assembly 20 is shown. The gasifier assembly 20 begins with a gasifier container assembly 22. The gasifier container assembly 22 generally has a cylindrical shaped sidewall 24. However, the sidewall 24 can be in any shape. Connected to the sidewall 24 is a top 26 and a bottom 28. Preferably, the bottom 28 is an inverted cone-shaped piece of metal to allow used ashes and overflow fuel or char to fall to a central point of an ash sump 30.

The ash sump 30 is connected to the bottom 28 of the gasifier container assembly 22 preferably is connected to an ash auger 32 for removing the fuel and ashes after they have been through the gasification process and fallen to the bottom of the gasifier assembly 20. The present invention may use an elevator 33 which takes the char or fuel from the auger 32 and recycles it back into the gasifier assembly 20. This allows for the further gasification of the char or fuel and creates a more efficient and more complete gasification of the fuel in the gasifier 20. In addition, less waste ashes have to be removed from the gasifier 20. Therefore, more complete gasification of the fuel is completed.

The waste ashes can be separated from the char or fuel by an ash separator 35. The ash separator preferably has a screen 39 for separating the waste ashes from the char or fuel which is to be recycled. Once separated, the ashes can be removed through the ash output 41 and the reusable char or fuel can be sent through the elevator 33.

The char created in the process of the present invention generally contains components that are of use in a variety of industries. In embodiments of the invention, the amount of ash by total weight of the char can be between 2 wt. % and about 20 wt. %, between about 4 wt. % and about 15 wt. %, or between about 7 wt. % and about 10 wt. %. In embodiments of the invention, the amount of moisture by total weight of the char can be between 1 wt. % and about 15 wt. %, between about 2 wt. % and about 12 wt. %, or between about 4 wt. % and about 9 wt. %. In embodiments of the invention, the amount of volatile matter by total weight of the char can be between 2 wt. % and about 25 wt. %, between about 4 wt. % and about 20 wt. %, or between about 7 wt. % and about 15 wt. %.

The char itself is made of many components. The components of the char are ultimately determined by what biomass is used. Generally, the char will have carbon and hydrogen. In embodiments of the invention, the char will have a carbon content of at least about 50 wt. %, preferably at least 55 wt. %, more preferably, at least 60 wt. %, most preferably at least 65 wt. %. In preferred embodiments the char will include at least carbon, hydrogen, and nitrogen.

Thus, it has been found that the process of the present invention creates char which has a high carbon content, preferably a carbon content of at least 50%. This means the char of the present invention's process can be extracted and used in conjunction with other processes, such as using it with iron ore to make steel. The gas created by the gasification process in the gasifier assembly 20 can also be extracted from the gasifier 20 through one or more ports 34. The gas can then be used as an energy source for other systems.

Figure 3:
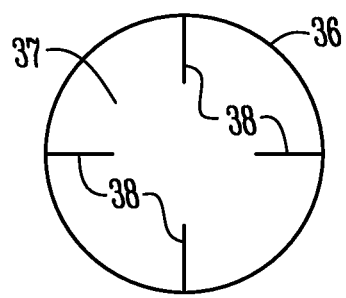
FIG. 3 shows a top view of one embodiment of the vertical shaft shown in FIG. 2.

Looking now at FIGS. 2 and 3, the gasifier assembly 20 has a vertical shaft 36 which extends through the gasifier container assembly 22 creating a fire tube 37. Preferably, the shaft 36 has one or more fingers 38 extending from a lower portion of the shaft 36. The fingers 38 can extend at any angle from the shaft 36. The fingers 38 allow for breaking up the fuel as it falls down and enters the fire tube 37 and during the gasifying process.

Below the shaft 36 is a rotating trough/bed 40. The rotating bed 40 is attached to a drive shaft 42 which is connected to a sprocket or pulley 44 which is in turn connected to the motor 50 via another sprocket or pulley 52 and a chain or belt 54. There is preferably a bearing (not shown) at the top and the bottom of the drive shaft 42 to facilitate even rotation of the drive shaft 42 and long life. There may also be fingers 43 extending from the drive shaft 42 to aid in mixing the fuel.

The motor 50 is preferably geared down so the drive shaft 42 and the rotating bed 40 rotate inside the gasifier assembly at approximately one revolution every four minutes. This rotating or revolving bed 40 allows for the solid fuel which rests on the bed 40 and rotates with the bed 40 to revolve, thereby creating more distribution of uniform heat within the circumference of the fire tube 37. This is accomplished by moving the hot spots within the solid fuel around inside the fire tube 37 thereby more uniformly heating the inside of the fire tube 37. In addition, the bed 40 can rotate intermittently and/or reverse directions.

Additionally, it is preferred, but not necessary, that the bed 40 have sidewalls 46 to reduce the amount of fuel falling off the bed 40 before it is thoroughly gasified. In other words, the fuel should remain on the bed 40 until the gasified fuel becomes high enough to fall over the sidewalls 46 and down to the ash sump 30. Furthermore, the bed 40 preferably has one or more fingers 48 extending upward from the bed 40 which allow the rotating bed 40 and the fuel to revolve and mix in a crossing path with the fingers 38 extending from the shaft 36. In other words, the fingers 38, 48 pass one another during revolution of the bed 40 and mix the fuel. This aids in more thorough gasification of the fuel.

Figure 4:
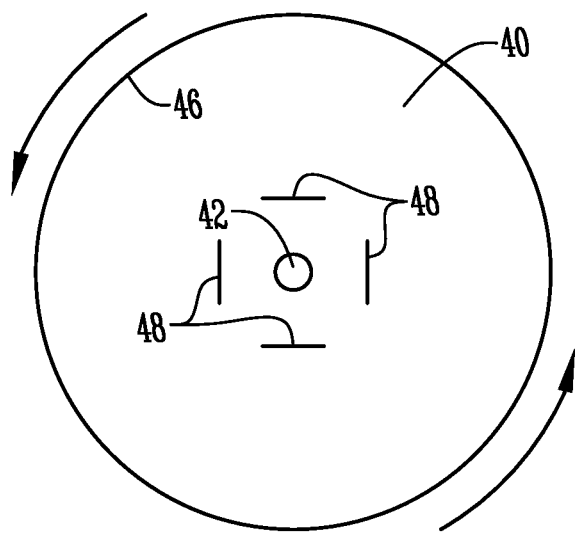
FIG. 4 shows a top view of one embodiment of the rotating trough or bed shown in FIG. 2.

As shown in FIG. 4, preferably there are four spaced apart fingers 48 on the bed 40. However, any number of fingers can be used. Preferably, the fingers 48 extend upward at any angle from the bed 40. In addition, the bed 40 can be made from solid sheet metal, perforated metal, expanded metal, or any other material capable of holding the fuel which is to be gasified. With or without holes the rotating bed 40, 78, 120, the ash builds up in the tray and falls over the side and into the gasifier's bottom for removal.

Figure 2A:
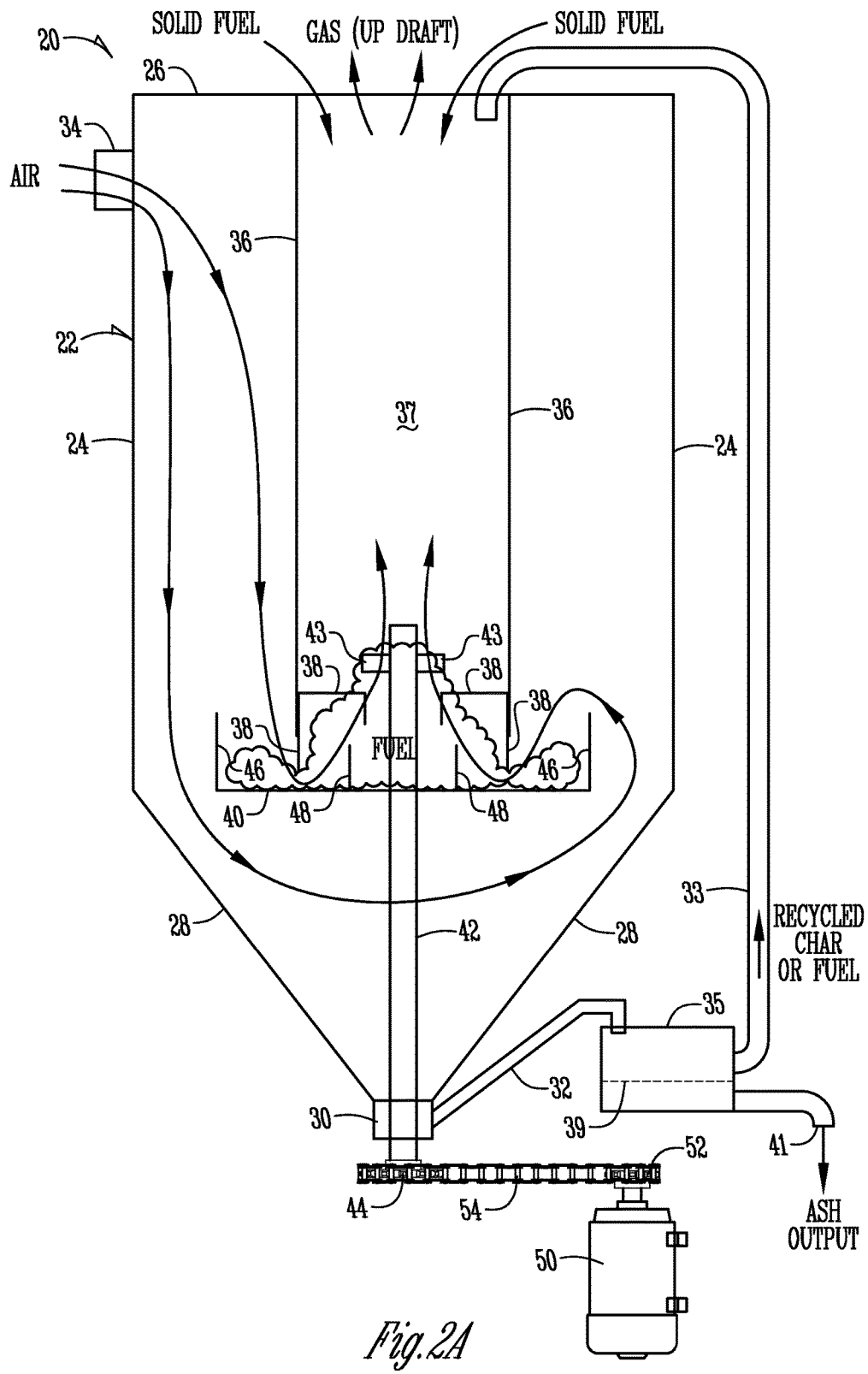
FIG. 2A shows the gasifier of FIG. 2 configured as an updraft gasifier.

FIG. 2A shows the gasifier assembly 20 configured as an updraft gasifier with the air flow reversed. In this embodiment, the air can enter the port 34, pass through the fuel and exit as a gas upward through the fire tube 37. Other aspects of the gasifier 20 remain the same.

Figure 5:
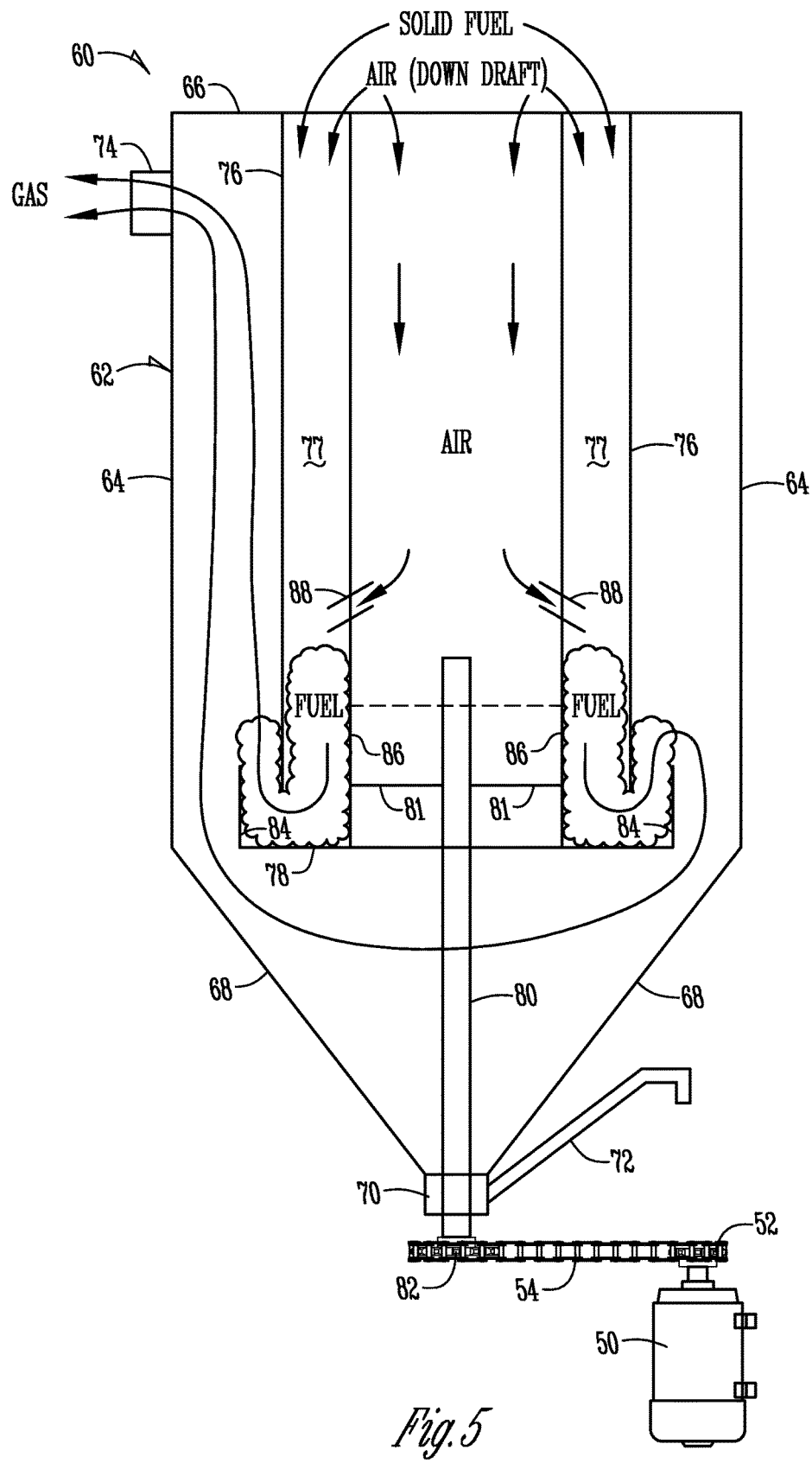
FIG. 5 shows a cut away view of another embodiment of a rotating bed gasifier.
Figure 6:
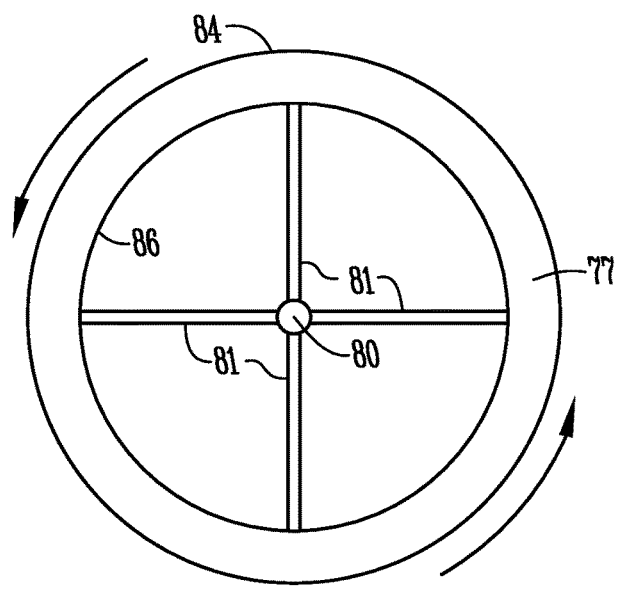
FIG. 6 shows a top view of one embodiment of the rotating bed shown in FIG. 5.

FIGS. 5 and 6 show another embodiment of a gasifier assembly 60. This gasifier assembly 60 operates similar to the gasifier 20 shown in FIG. 2. As shown in FIGS. 5 and 6, the gasifier 60 has a gasifier container 62, with sidewalls 64, top 66 and bottom 68. Preferably, attached to the bottom 68 is an ash sump 70 and an auger 72 for removing the used ashes. In addition, an elevator or other device can be used for recycling the used ashes into the gasifier assembly 60. Again, the gasifier 60 preferably has one or more ports 74 for allowing the gas created in the gasifier 60 to be directed out of the gasifier 60 and used.

In the embodiment shown in FIGS. 5 and 6, the gasifier 60 has a shaft 76 extending downward or vertically into the gasifier container 62 creating a fire tube 77. In the embodiment shown in FIGS. 5 and 6, the gasifier assembly 60 has a rotating trough or bed 78 connected to a drive shaft 80 for revolving the rotating bed 78 similar to that shown in the gasifier assembly 20 of FIGS. 2 and 2A. Support brackets 81 support the bed 78 to the drive shaft 80. There is preferably a bearing (not shown) at the top and the bottom of the drive shaft 80 to facilitate even rotation and long life. Preferably, the drive shaft 80 has a sprocket 82 which connects to a motor assembly 50 for rotating the bed 78. Again, it is preferred that the bed 78 rotates approximately one revolution every four minutes, however other rotations can be used with the present invention. The rotating bed 78 has outside sidewalls 84 to help hold the fuel onto the bed 78. However, the rotating bed 78 has inside sidewalls 86 which extend up into the shaft 76, thereby creating an elongated ring-shaped fire tube 77. This is best shown in FIG. 6. By being constructed in this manner, air can draft downward through the center of the inside sidewalls 86 and enter through optional vents 88 to provide more air for the gasification process. This type of rotating bed 78 also helps to reduce hot and cold spots within the gasifier assembly 60. In addition, the added air coming in through the vents 88 create improved gasification of the fuel. In addition, this gasifier 60 can have updraft air flow.

Figure 8:
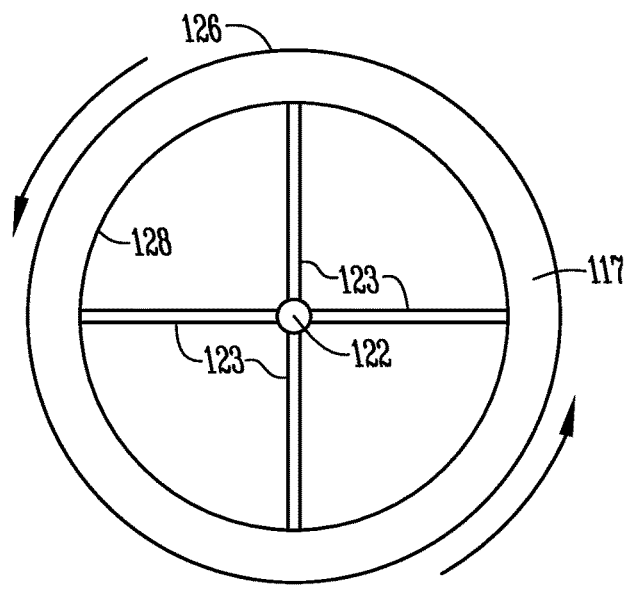
FIG. 8 shows a top view of one embodiment of the rotating bed shown in FIG. 7.
Figure 7:
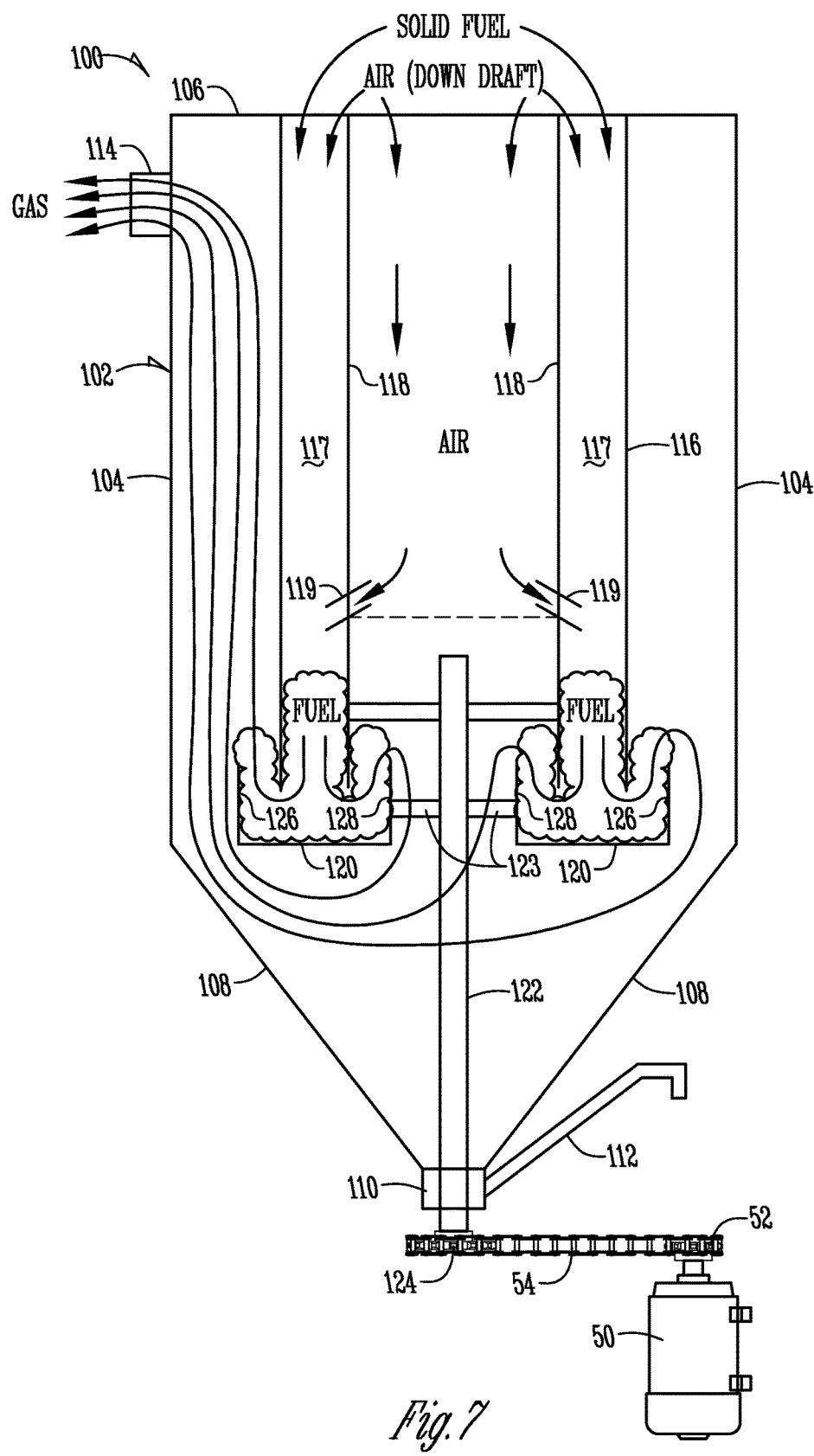
FIG. 7 shows a cut away side view of yet another embodiment of a rotating bed gasifier.

Still another embodiment of the rotating gasifier assembly 100 is shown in FIGS. 7 and 8. Here again, the gasifier assembly 100 has a gasifier container 102 with sidewalls 104, a top 106, bottom 108, ash sump 110, auger 112, and port 114. The gasifier assembly 100 shown in FIGS. 7 and 8 has a first vertical shaft 116 and a second vertical shaft 118 located concentrically inside the first vertical shaft 116. This creates an elongated ring fire tube 117 as shown in FIG. 8, that is similar to that shown in FIG. 6. However, the second shaft 118 does not rotate with the rotating trough/bed 120. Downdraft air can enter the second vertical shaft 118 and pass through optional vents 119 to enter the fire tube 117 to aid in the gasification of the fuel. The rotating bed 120 is attached to a drive shaft 122 by support brackets 123. There is preferably a bearing (not shown) at both the top and the bottom of the drive shaft 122 to facilitate even rotation and long life. A motor assembly 50 or other similar type driving device is used for creating the revolving motion of the rotating bed 120. It is preferred, that the rotating bed 120 have outside walls 126 and inside walls 128 extending upward from the rotating bed to reduce overflow of the fuel until the gasifying process takes its course.

It is understood that the rotating bed gasifier assemblies 20, 60, 100 can have different shaped or designed rotating beds 40, 78, 120, 142. In addition, the rotating bed 40, 78, 120 can be created with sheet metal, perforated metal, expanded metal, or any other material suitable for holding the fuel which is to be gasified. Furthermore, the rotation of the bed 40, 78, 120, 142 can be any appropriate speed or direction. It is preferred, however that the speed of the rotating bed 40, 78, 120 not be so fast as to reduce or impede the gasifying process.

The preferred fuel for this gasifier is shelled corn. However other fuels can be used. Air is sucked, blown, or both through the fuel which is heated and pyrolyzed, forming gas for the gasification process. The gasification process is self-sustaining with a blower (not shown) operating. The rotating bed 40, 78, 120, 142 replaces the function of a fixed grate in standard gasifiers in the art. The gasification process generally continues until the blower (not shown) or rotating bed 40, 78, 120 stops.

The direction of rotation of the rotating bed 40, 78, 120, 142 can be clockwise or counterclockwise. In addition, the bed 40, 78, 120, 142 can agitate or move intermittently, whatever motion works best for the fuel which is being used. It is preferred that the ring-type rotating troughs 78, 120 are used in place of the pan-type rotating trough 40 once the specifications require the rotating tray to be larger than approximately 36 inches in diameter. This ensures better fuel agitation, which is necessary to overcome the problems of biomass gasification. In addition, ring-type troughs also increases the rate of gasification by substantially increasing the reactive area in the gasifier 20, 60, 100. Rather than restricting the gas flow to the outside of the ring, a ring-type trough may also allow gas to flow across the inside of the ring, as best shown in FIG. 7. In addition to reinforcing the rigidity of the rotating tray 78, 120, the braces or brackets 81, 123 serve to move char/ash to the removal sump 70, 110 where it can be augured out by the auger 72, 112.

The recycling of char back into the fire tube 37, 77, and 117 uses a natural by-product of biomass gasification. Essentially, the char/ash auger 32, 72, 112 is elevated back to the top of the gasifier 20, 60, 100 and reintroduced/recycled by combining it with new solid fuel or biomass fuel which is being fed into the gasifier 20, 60, 100 for the first time. This greatly reduces the amount of ash produced in the process because it gets reused and further reduced each time it is reused.

In addition to biomass fuel, plastic fuel can be combined with biomass fuel to form a fuel blend. Because the plastic is a petrol-chemical derivative, it burns much faster than the biomass fuel. As a result, a filtering effect with this blended fuel can be accomplished by introducing dirty gasses from petrol/fossil fuels which are burned separately in a combustor similar to that as shown as a gasifier system 10 in FIG. 1. Many dirty fuels cannot be blended in this way because of metal which is contained within them. Using dirty fuels with metallic contents would clog the gasifier. Examples of such dirty fuels are tire fluff, medical waste, and circuit boards. However, if the plastics/rubber are homogeneous, blending them with biomass in the proper amount allows their clean burning while increasing the energy output from the gasifier. While any type of fuel can be used within the gasifiers of the present invention, it is noted that petrochemical derived fuels cannot easily be gasified by themselves. These fuels melt which in turn restricts the necessary air flow and therefore severely limits or stops the gasification process.

Figure 9:
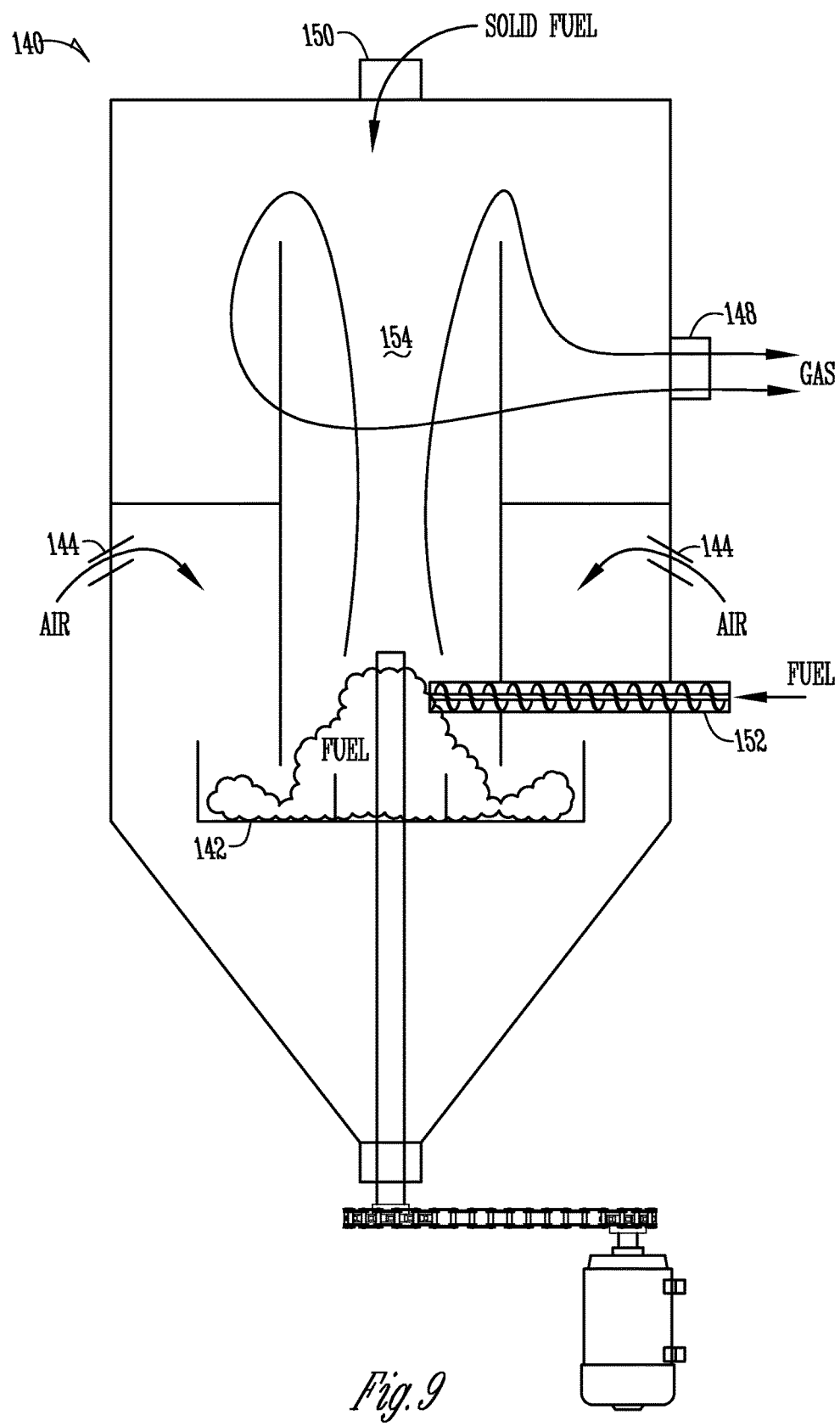
FIG. 9 shows a cutaway view of still another embodiment of a rotating bed gasifier.

It is widely known in the art that coal cannot generally be downdraft gasified easily. Therefore, a gasifier assembly 140 is shown in FIG. 9 as an inverted downdraft gasifier. This gasifier assembly 140 works similar to the previously described gasifiers 20, 60, 100 with a rotating bed assembly 142. This gasifier assembly 140 allows air to flow inward through one or more vents 144, through the fuel, and out through one or more ports 148. This embodiment shows that either a top fuel inlet 150 or a bottom fuel inlet auger 152 can supply fuel into the gasifier 140. The top fuel inlet 150 allows for fuel to enter the gasifier assembly 140 and fall downward into the fire tube 154 for gasification. The bottom fuel inlet auger 152 similarly gets the fuel to the inside of the fire tube 154, however, the bottom fuel inlet auger 152 uses a mechanical auger for feeding the fuel into the fire tube 154. According to this embodiment, top fuel inlet 150 requires an airlock (not shown). It is preferred that the top input design would not be used if rubber or plastic is mixed with the biomass fuel. In this case, it is preferable that the bottom input design be used for the purpose of combining biomass fuel with petro-chemical derived fuels.

C. Movable Bed Gasifier

According to one embodiment of the invention, the bed 340 of the gasifier 220 is adjustable in height relative to either the fire tube 337 or the enclosure 322, thereby regulating fuel flow to the burning fuel.

As previously described, as the fuel or char is consumed by the burning process, it produces ash. The bed 40 includes sidewalls 46 which reduce the amount of fuel falling off of the bed 40, thereby increasing the burn time of the fuel. As more fuel is added, however, fuel builds up inside the sidewalls 46 of the bed 40 and outside the shaft 36. This buildup of fuel restricts the amount of air which may either enter (see FIG. 2A) or exit (see FIG. 5) the shaft 37. This process also increases the amount of ash which is retained during the process, which increases filtration of the gas and insulation between the burning fuel and bed 40. As a result, more complete combustion of the fuel may be realized by adjusting the gap formed between the sidewalls of the bed 40 and fire tube 37. In most embodiments, the sidewalls are of a fixed height, and therefore adjustment of the gap between the sidewalls and fire tube corresponds to the gap between the fire tube and bed.

Several embodiments of the movable bed will now be described in detail. These embodiments are not intended to limit the scope of the invention but rather illustrate variations of the invention.

Figure 13:
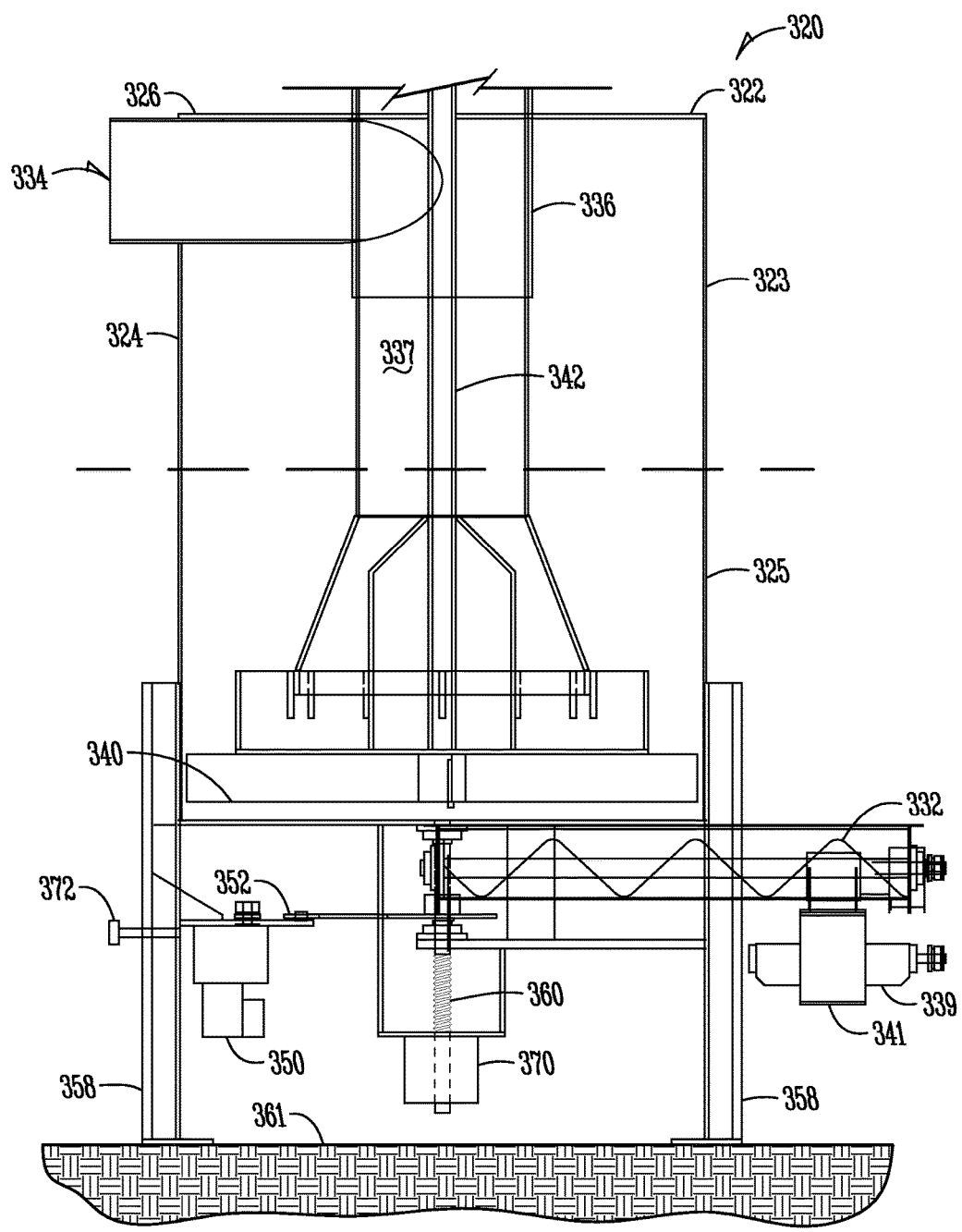
FIG. 13 shows a cutaway view of still another embodiment of a gasifier with an adjustable height rotating bed.

One specific embodiment is shown in FIG. 13. In this example, the gasifier 320 has an enclosure 322 with sides 324, top 326 and one or more ports 334. Within the enclosure 322 is a fire tube 337 extending downwardly from the top 326 to a bed 340. The bed 340 has raised sidewalls which serve to contain fuel, char and ash during the gasification process.

The bed 340 has a shaft 342 extending through. This shaft 342 is keyed to the bed 340 and a sprocket 344, thereby transferring rotational motion from the sprocket 344 to the bed 340. The sprocket is attached via a chain 354 to a motor 350 and sprocket 352 assembly. Below the sprocket 344 the shaft 342 has an external thread 360. This thread 360 extends through a second motor 370. The second motor 370 includes, for example, a worm gear which, when activated, adjusts the height of the shaft 342 and bed 340. It is also desirable in such a situation to have an adjustable motor mount 372 which may be engaged to adjust the position of the motor 350 to maintain rotation of the bed 340.

According to an alternative embodiment, the enclosure 322 is separated into a top part 323 and an overlapping bottom part 325. Legs 358 support the bottom part 325 while a second support system (such as a scaffolding, legs, ceiling-mounted support, or other commonly known structure) supports the top part 323. The legs 358 are mounted to an elevator built into the floor 361. When it is desirable to adjust the fuel flow to the fuel by adjusting the gap between the fire tube 337 and bed 340, the elevator is raised or lowered. In this manner, fuel flow and burn rate are controlled without requiring sensitive components (such as an electric motor) to be exposed to falling ash and char.

According to an alternative embodiment, the bed 340 has a tube attached to the bottom and surrounding the shaft 342.

The tube is keyed to the shaft 342 along its length so the bed 340 may be adjusted up or downwards as required without needing to adjust the shaft 342 and motor 350. The tube may have a thread thereon, corresponding to a worm gear on a second motor 370.

According to an alternative embodiment, drive shaft 342 is a telescoping shaft, having one or more shafts located within the drive shaft 342. The shaft forms the piston of a hydraulic or pneumatic piston. As hydraulic or pneumatic pressure is applied, the telescoping shaft extends, thereby raising the floor. The telescoping shaft may then be locked in this position by constant pressure or a mechanical interface, such as a pin, brace, screw, or other commonly known mechanical interface.

According to an alternative embodiment, bed 340 is attached to drive shaft 342 by a bearing and key, the key transferring rotation from the drive shaft 342 to the bed 340, and the bearing allowing movement of the bed 340 up and down the shaft 342. A separate lift is attached to the bed 340, the lift providing vertical adjustment of the floor 40 according to demand. This lift may be a single or series of hydraulic pistons, a worm gear and threaded rod, or other form of lift.

According to an alternative embodiment, the sidewalls of the bed are formed by a continuous tube extending from the floor 361 (or bottom of the enclosure) and overlapping the fire tube. The bed 340 is movable, according to any of the above discussed alternatives, so the height of the sidewalls and gap between the bed 340 and fire tube 337 is adjusted.

In operation, a fuel is selected from a group for which the optimal fuel flow is known. The optimal fuel flow for a given fuel may be determined in a pre-production gasification process as the optimal rate of fuel flow may depend on the density of the fuel and consistency. The fuel is provided to the bed where it is heated and the bed is rotated to provide even heating throughout the fuel pile. As the fuel is combusted, ash is produced, which builds up with the fuel or char on the bed against the sidewalls. Once the char and ash reach the height of the sidewalls, the material falls to the ash collector and the unburnt char is recycled into the fuel source. As the ash builds up, the air passageway between the bed and the shaft is occupied by the char and ash mixture.

At this point it becomes necessary for an operator to monitor the temperature of the burning fuel or char and adjust the height of the floor to increase or decrease fuel flow to the fuel or char. It is expected that as ash and char builds up about the sidewalls of the floor, the bed may be lowered to increase fuel flow to the burning fuel or char. As efficiency of the system is increased due to increased fuel flow, the ratio of ash to unburnt fuel is increased, which may necessitate raising the bed to maintain fuel flow at a steady rate. It therefore may be necessary for an operator to continuously monitor the temperature of the burning fuel or char, amount of ash production, and rate of fuel consumption in order to maximize energy captured during the gasification process.

It is also important to monitor the gas quality and quantity released by the burning fuel or char. Gases such as CO (Carbon Monoxide), $CO_2$ (Carbon Dioxide), H (Hydrogen), and oxygen are important gasses which are used to determine both the quality of the useable gas but also the consumption rate of the fuel. In the useable gas produced, high levels of CO and H are desirable, while high levels of oxygen and $CO_2$ are undesirable as indicators of combustion. It is contemplated by the present disclosure that an automated monitoring system may determine the concentration of these gases in the useable gas and adjust the height of the bed or fire tube as necessary.

As an alternative embodiment, pure oxygen rather than ambient air may be injected into the system in order to produce a higher energy gas output. Other combinations of gasses may also be used without limitation, for example, half ambient air and half pure oxygen. Further combinations are anticipated as being within the scope of this disclosure.

The term "fuel flow" as used incorporates several concepts. As fuel is consumed and char and ash are produced, the lighter char and ash are pushed up the sidewalls of the bed. When this combination reaches the height of the sidewalls, the ash and char are forced over the edge to be collected and/or recycled. Fuel consumption rate must therefore conform to the waste disposal rate. If more fuel is added, the consumption rate increases and therefore the disposal rate must also increase. To do so, the bed may be adjusted so that more ash is disposed of from the bed. Additionally, the rate of consumption of the fuel is further limited due to the insulative properties of the char.

D. Adjustable Fire Tube

Figure 11:
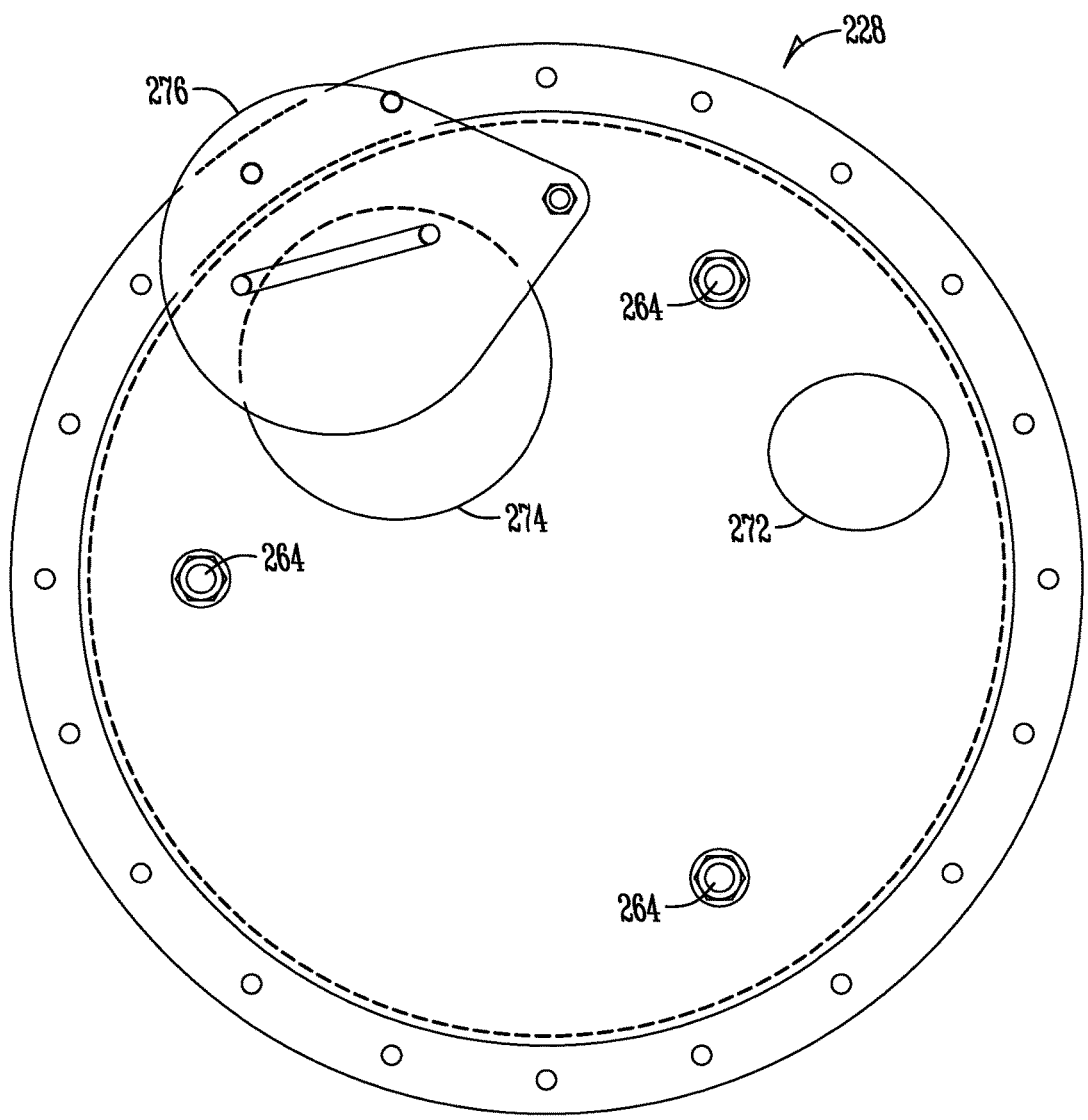
FIG. 11 shows a view of the top of the gasifier taken along line 11-11.
Figure 12:
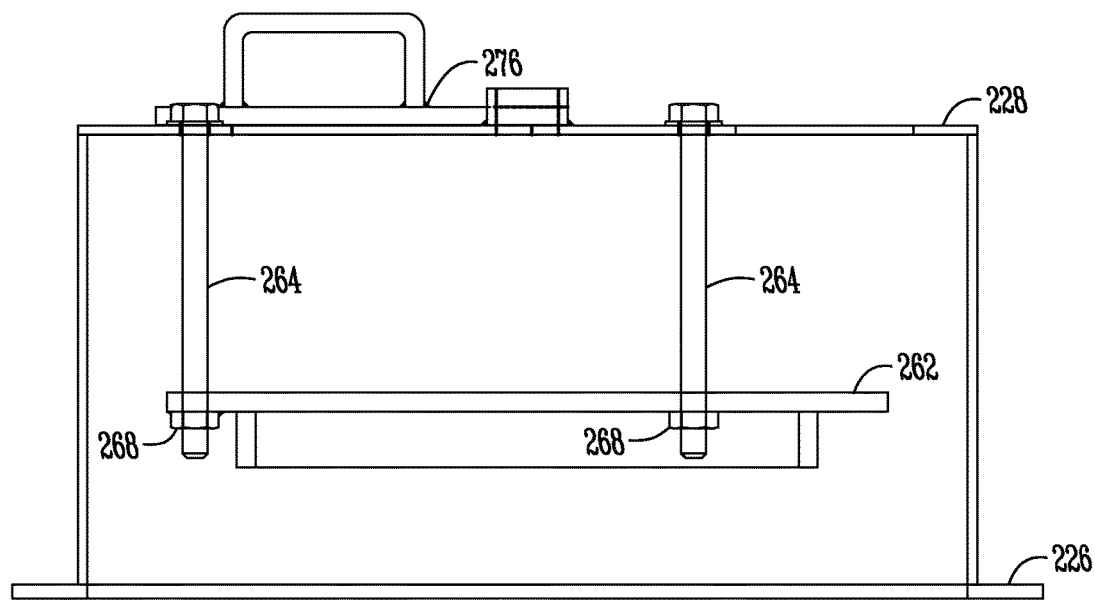
FIG. 12 shows a cutaway of the side of the recess.

A further embodiment of the present invention is illustrated in FIGS. 11-13.

As in previous embodiments, the gasifier 220 includes a gasifier container assembly 222 having side walls 224 a top 226, and further having a recess 228 adjacent the top 226. Within the gasifier container assembly 222 resides the shaft 236 containing the fire tube 237. Beneath the shaft is the rotating bed assembly 240 as previously described. The rotating bed assembly 240 is attached to a drive shaft 242 which is in turn connected to a sprocket 244 which receives power from a motor 250 through a second sprocket 252 and chain 254.

The drive shaft 242 extends from a bearing (not shown) adjacent the sprocket 244 through the rotating bed assembly 240 and the fire tube 237, terminating at the end of the fire tube 237 where it is supported by a drive shaft sleeve 266. The drive shaft sleeve 266 itself is attached to a cap 262 on the top of the shaft 236 which forms the fire tube 237.

FIG. 11 is a view taken along line 11-11, showing the top of the recess 228. On the recess 228 are located three holes, a fuel opening 272 and an air opening 274. The air opening 274 is closable by an adjustable cover 276 which regulates the fuel flow through the fire tube 237. The fuel opening 272 allows the fuel tube 238 (see FIG. 10) to pass through, delivering new or recycled fuel to the bed 240.

As shown in FIG. 12, three screws 264 pass through the recess 228 and engage the cap 262. The cap 262 has corresponding locations 268 (which may be weld nuts, tapped holes, threaded posts, or similar structure known in the art) which receive the screws 264 (threaded rods, internally threaded bars, or other structure complementing the locations 268). The screws 264 are not threaded completely into the locations 268, but rather a space is left between the cap 262 and the top of the recess 228. By adjusting the screws 264, the cap can be raised or lowered as desired. The cap 262 is permanently affixed to the top of the shaft 236, therefore as the cap 262 is raised or lowered by adjusting the screws 264, the shaft 236 is raised or lowered relative to the rotating bed 240.

Figure 10:
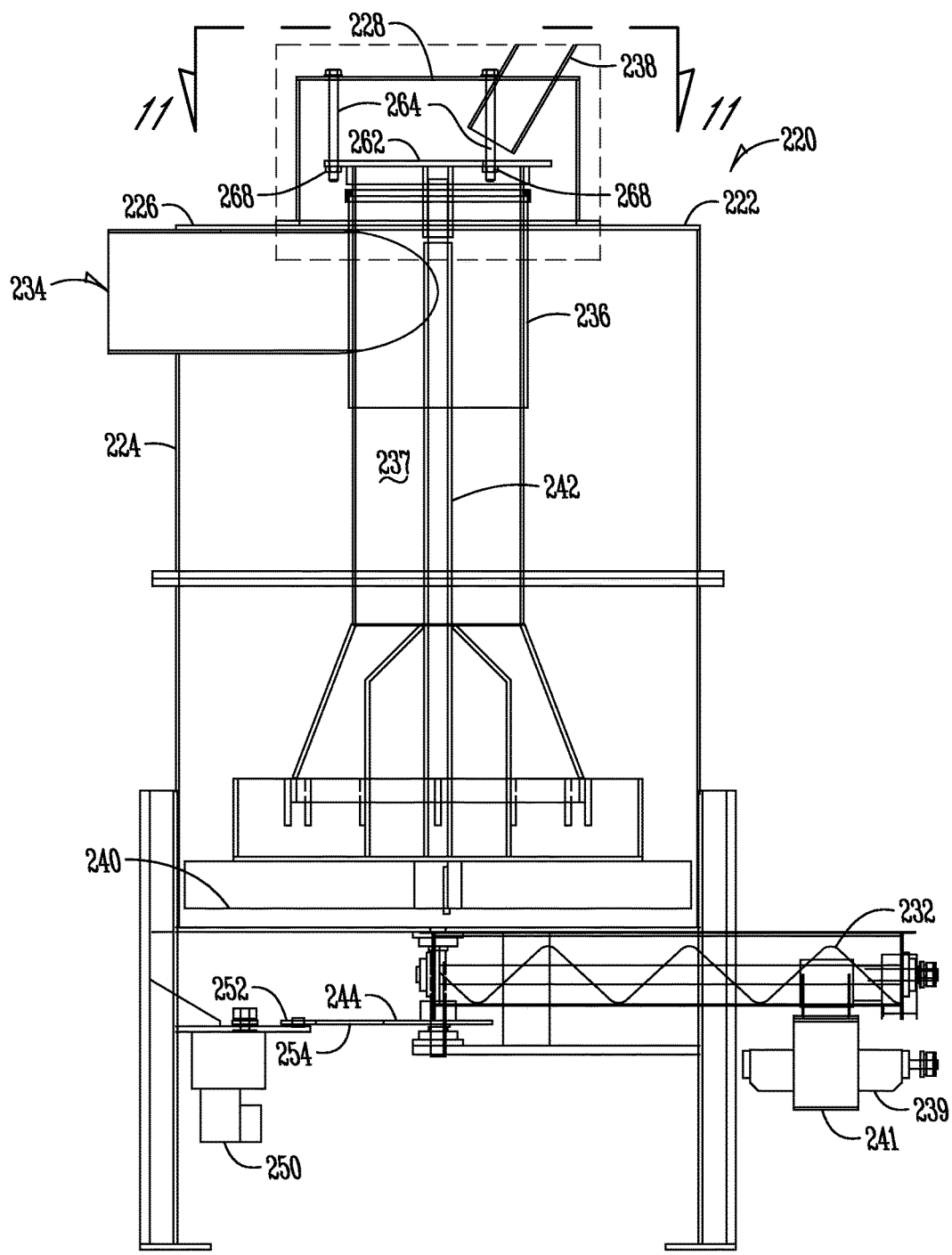
FIG. 10 shows a cutaway view of still another embodiment of a rotating bed gasifier with an adjustable fire tube.

As further shown in FIG. 10, the recess 228 is appropriately sized to accommodate the fire tube 237 as it is raised or lowered. Additionally, the shaft sleeve 266 is sized appropriately so as to remain in continuous contact with the drive shaft 242 which remains fixed as the cap 262 is raised and lowered.

While the current method of raising and lowering the fire tube 237 is described as essentially a manual process, it may be preferable to automate the process, thereby reducing risk to operators and allowing for fully automated control of the gasification process.

As previously described in detail, it is necessary to maintain a consistent fuel flow through the burning fuel in order to achieve optimum combustion. By adjusting the height of the fire tube 237 relative to the rotating bed 240, additional fuel flows to and through the burning fuel. By carefully monitoring the consumption rate of the fuel as well as the amount of unspent fuel discharged, the optimum gap size can be determined.

Further, any of the above described methods for adjusting the height of the rotating bed relative to the fixed fire tube may also be adapted to adjust the height of the fire tube relative to a fixed bed. It may also be preferable in some environments to combine a movable bed with a movable fire tube. Such an arrangement is contemplated by the present invention.

While the present invention also applies to a rotating bed gasifier, it is not the intention of this disclosure to limit the adjustable bed and fire tube to a gasifier having a rotating bed. A fixed, nonrotating bed would be just as well served by the contemplated improvement.

E. Conclusion

It is understood that even though specific references are made to certain parts or sections of the invention in the figures, these specific parts or figures or design styles can be interchanged on any of the gasifiers as may be desired for a specific situation. In other words, any of the features or designs shown or contemplated can be used on any of the contemplated gasifiers.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims.

EXAMPLE

An embodiment of the present invention is exemplified in the following non-limiting Example. It should be understood that this Example, while indicating certain embodiments of the invention, is given by way of illustration only. From the above discussion and this Example. Thus, various modifications of the embodiments of the invention, in addition to those shown and described herein, will be apparent to those skilled in the art from the foregoing description. Such modifications are also intended to fall within the scope of the appended claims.

Char was created through the processes described in this application. The resultant char had a composition as shown the following tables.

TABLE 1

| Replicate | % Moisture | % Volatile Matter | % Ash |
|---|---|---|---|
| 1 | 6.9655 | 10.1641 | 9.301 |
| 2 | 6.8877 | 15.508 | 8.877 |
| 3 | 5.9412 | 11.8407 | 8.088 |

TABLE 2

| Sample | Weight (mg) | Nitrogen (%) | Carbon (%) | Hydrogen (%) | Nitrogen (mg) | Carbon (mg) | Hydrogen (mg) |
|---|---|---|---|---|---|---|---|
| 1 | 2.81 | 2.806 | 66.644 | 3.243 | 0.082 | 1.940 | 0.101 |
| 2 | 2.25 | 2.839 | 66.539 | 3.391 | 0.066 | 1.551 | 0.084 |
| 3 | 2.45 | 2.819 | 66.688 | 3.367 | 0.072 | 1.693 | 0.091 |

What is claimed is:

1. A method of gasifying biomass fuel comprising:
selecting a fuel;
inserting the fuel through a fire tube and onto a bed of a gasifier, the bed having sidewalls extending therefrom;
adjusting a gap formed between the fire tube and sidewalls to provide fuel flow for optimal gasification based on the fuel selected;
adjusting the height of the fire tube relative to the sidewalls to achieve a preferred fuel consumption rate with a leg mounted to an elevator built into and located at least partially below a floor of the bed;
supplying heat and air to the fuel;
stirring the fuel to promote uniform gasification of the fuel; and
adjusting the gap to provide consistent fuel flow as the fuel is gasified.

2. The method of claim 1 wherein the stirring of the fuel is by rotating the bed which is supporting the fuel.

3. The method of claim 2 wherein the bed rotation is about ¼ revolution per minute.

4. The method of claim 1 further comprising recycling fuel into the fire tube.

5. The method of claim 1 wherein the gap is adjusted by raising or lowering the bed.

6. The method of claim 1 wherein the gap is adjusted by raising or lowering the fire tube.

7. The method of claim 1 further comprising forming char.

8. The method of claim 7 wherein said char has a carbon content of at least 50 wt. %.

9. The method of claim 7 wherein said char has a carbon content of at least 60 wt. %.

10. The method of claim 7 wherein said char comprises carbon, hydrogen, and nitrogen.

11. The method of claim 7 wherein said char has an amount of ash by total weight of between 2 wt. % and 20 wt. %.

12. The method of claim 7 wherein said char has an amount of ash by total weight of between 4 wt. % and 15 wt. %.

13. The method of claim 7 wherein said char has an amount of ash by total weight of between 7 wt. % and 10 wt. %.

14. The method of claim 7 wherein said char has an amount of moisture by total weight of between 1 wt. % and 15 wt. %.

15. The method of claim 7 wherein said char has an amount of moisture by total weight of between 2 wt. % and 12 wt. %.

16. The method of claim 7 wherein said char has an amount of moisture by total weight of between 4 wt. % and 9 wt. %.

17. The method of claim 7 wherein said char has an amount of volatile matter by total weight of between 2 wt. % and 25 wt. %.

18. The method of claim 7 wherein said char has an amount of volatile matter by total weight of between 4 wt. % and 20 wt. %.

19. The method of claim 7 wherein said char has an amount of volatile matter by total weight of between 7 wt. % and 15 wt. %.

20. The method of claim 1 wherein the fuel consists essentially of 20% synthetic fuel and 80% biomass fuel.

21. The method of claim 11 further comprising pyrolyzing the fuel to produce a synthetic gas.

* * * * *